United States Patent
Nakatsuka et al.

[11] Patent Number: 6,167,497
[45] Date of Patent: *Dec. 26, 2000

[54] DATA PROCESSING APPARATUS AND REGISTER ADDRESS TRANSLATION METHOD THEREOF

[75] Inventors: Yasuhiro Nakatsuka, Koganei; Koyo Katsura, Hitachiota, both of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/871,978

[22] Filed: Jun. 10, 1997

[30] Foreign Application Priority Data

Jun. 19, 1996 [JP] Japan ................................. 8-158445

[51] Int. Cl.$^7$ ................................................. G06F 12/02
[52] U.S. Cl. ............................... 711/202; 711/5; 712/228
[58] Field of Search .................................. 711/202, 209, 711/5, 220; 395/393, 569, 800.23, 394, 391, 392, 382, 677, 678; 712/217, 228, 23, 218, 215, 216, 206; 709/107, 108

[56] References Cited

U.S. PATENT DOCUMENTS

| | | | |
|---|---|---|---|
| 4,217,638 | 8/1980 | Namimoto et al. | 711/220 |
| 4,296,468 | 10/1981 | Bandoh et al. | 711/202 |
| 4,459,657 | 7/1984 | Murao | 711/220 |
| 4,853,849 | 8/1989 | Bain, Jr. et al. | 711/202 |
| 5,093,783 | 3/1992 | Kitada | 711/220 |
| 5,293,594 | 3/1994 | Nojiri et al. | 711/220 |
| 5,307,502 | 4/1994 | Watanabe et al. | 395/569 |
| 5,386,563 | 1/1995 | Thomas | 395/569 |
| 5,388,239 | 2/1995 | Iimura et al. | 711/220 |
| 5,392,411 | 2/1995 | Ozaki | 711/1 |
| 5,437,043 | 7/1995 | Fujii et al. | 395/800.01 |
| 5,440,714 | 8/1995 | Wang | 711/165 |
| 5,581,721 | 12/1996 | Wada et al. | 711/202 |
| 5,615,348 | 3/1997 | Koino et al. | 711/5 |
| 5,696,957 | 12/1997 | Yamaura et al. | 395/569 |
| 5,897,665 | 4/1999 | Padwekar | 711/220 |

OTHER PUBLICATIONS

"Microprocessor", Nikkei Datapro, P1, MC1–303–801 to 808, Jun. 1990.

*Primary Examiner*—Eddie P. Chan
*Assistant Examiner*—Yamir Encarnacion
*Attorney, Agent, or Firm*—Antonelli, Terry, Stout & Kraus, LLP

[57] ABSTRACT

A data processing apparatus includes physical registers larger in number than logical registers specified by a register specification field of an instruction executed by the apparatus. The physical registers are classified into a plurality of banks. In response to a particular instruction, an execution control section supplies a register address converter with bank information to select a bank of the physical register. The converter stores the bank information in a bank register. Receiving logical register address information specified by the register specification field of the instruction, the address converter adds the bank information set to the bank register to at least a portion of the logical register address information, thereby producing a physical register address which can specify any one of the physical registers.

24 Claims, 13 Drawing Sheets

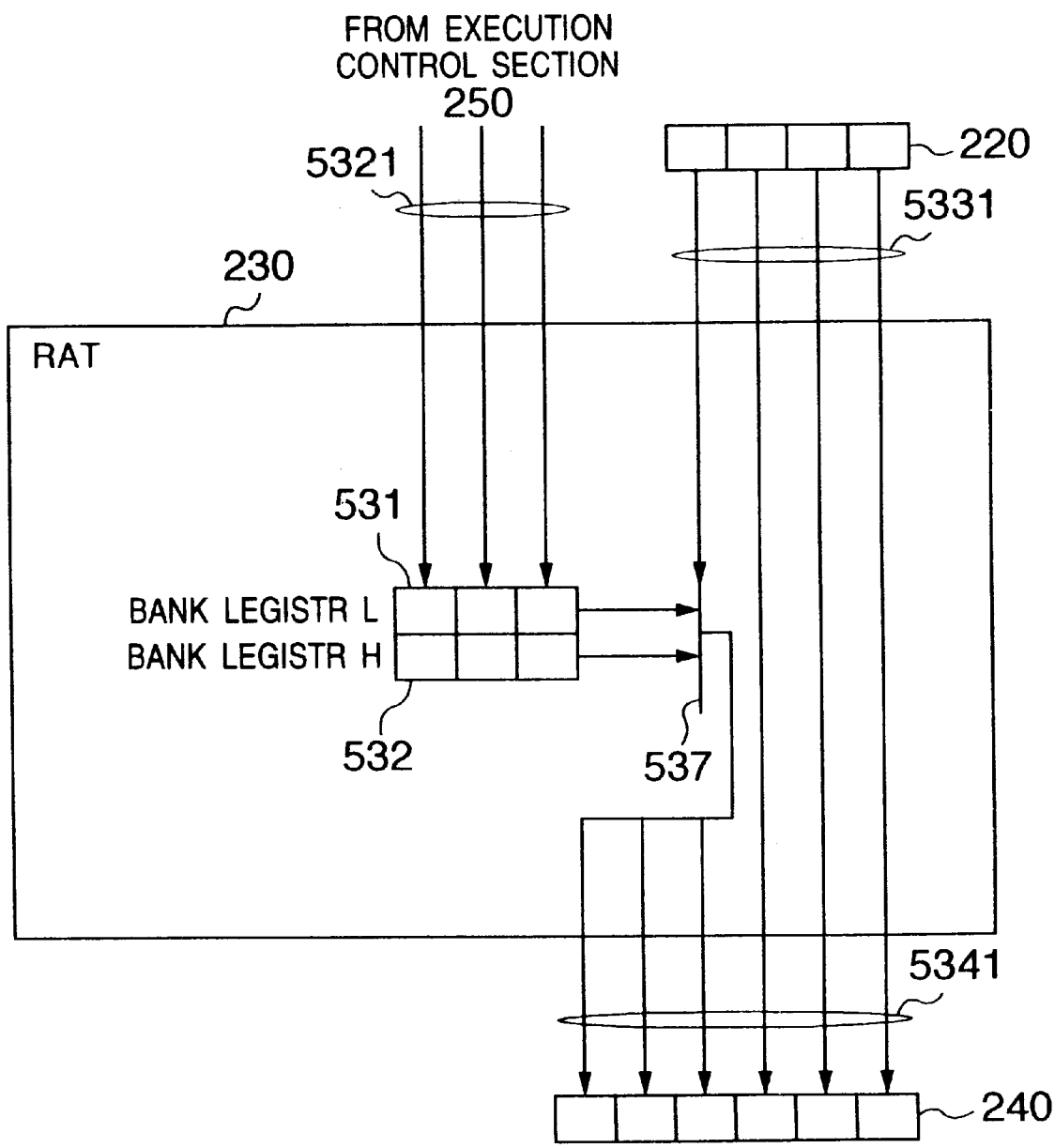

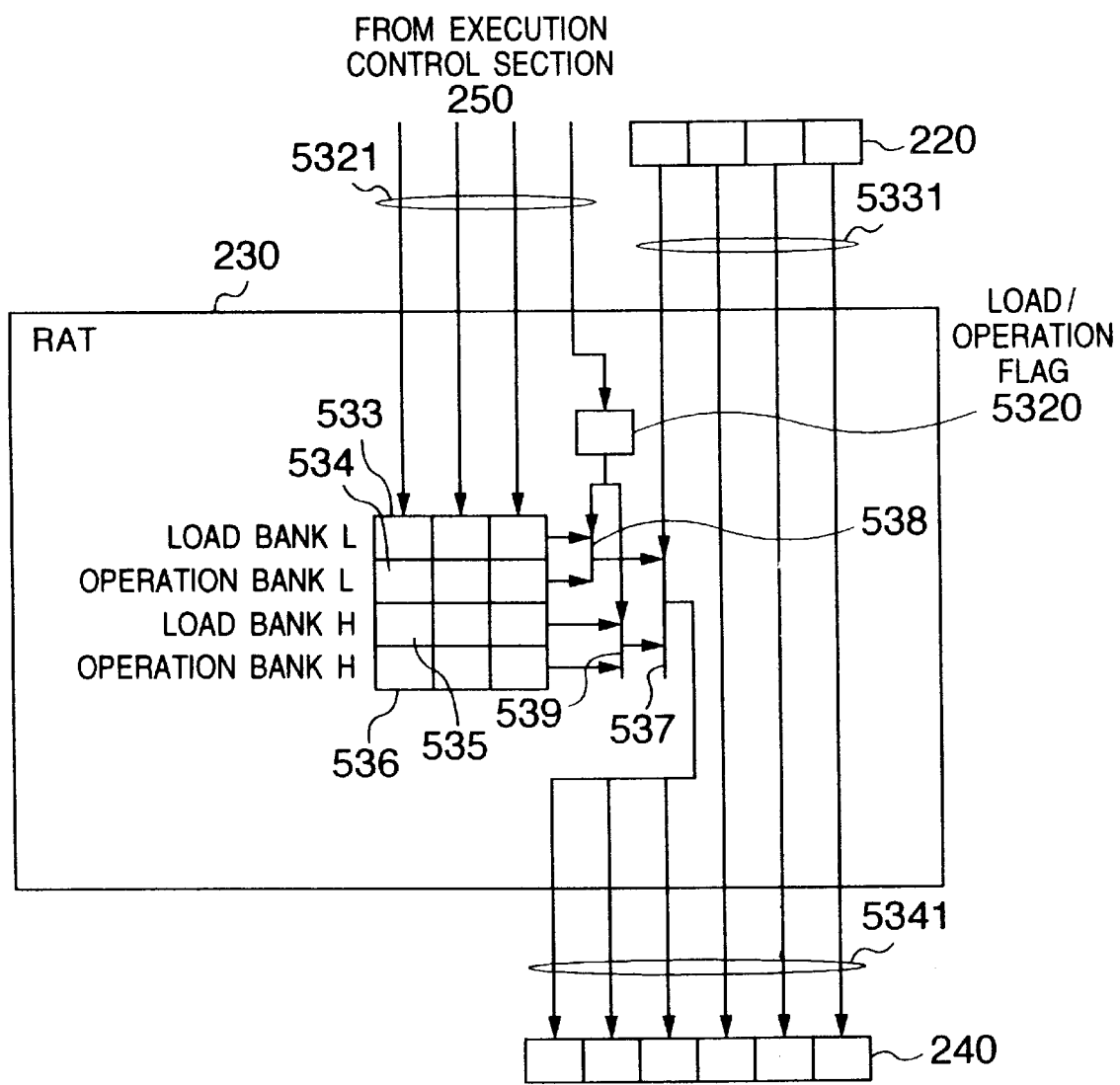

REGISTER CORRESPONDENCE TABLE

|  | "LOAD" | OTHER THAN "LOAD" |
|---|---|---|
| LOGICAL BANK L (fr00-07) | 02 | 01 |
| LOGICAL BANK H (fr08-15) | 04 | 04 |

S21 — COMMAND CODE

| | |
|---|---|
| 1 | mov #A, r4 |
| 2 | mov #p, r5 |
| 3 | mov #p', r6 |
| 4 | fldi0 fr8 |
| 5 | fldi0 fr9 |
| 6 | fldi0 fr10 |
| 7 | fldi0 fr11 |
| 8 | fmov.s @r4+, fr4 |
| 9 | fmov.s @r4+, fr5 |
| 10 | fmov.s @r4+, fr6 |
| 11 | fmov.s @r4+, fr7 |
| 12 | fmov.s @r5, fr0 |
| 13 | fmac fr4, fr8 |
| 14 | fmac fr5, fr9 |
| 15 | fmac fr6, fr10 |
| 16 | fmac fr7, fr11 |
| 17 | fmov.s @r4+, fr4 |
| ... | ⋮ |
| 25 | fmac fr7, fr11 |
| 26 | fmov.s @r4+, fr4 |
| ... | ⋮ |
| 34 | fmac fr7, fr11 |
| 35 | fmov.s @r4+, fr4 |
| ... | ⋮ |
| 43 | fmac fr7, fr11 |
| 44 | fmov.s fr8, @-r6 |
| 45 | fmov.s fr9, @-r6 |
| 46 | fmov.s fr10, @-r6 |
| 47 | fmov.s fr11, @-r6 |

47×n COMMANDS
(282 COMMANDS FOR n = 6)

FIG. 10B
PRIOR ART

MEMORY MAP

| | | |
|---|---|---|
| r4→#A+00 | A11 | →fr4 |
| #A+04 | A21 | →fr5 |
| #A+08 | A31 | →fr6 |
| #A+0c | A41 | →fr7 |
| #A+10 | A12 | |
| #A+14 | A22 | |
| #A+18 | A32 | |
| #A+1c | A42 | |
| ... | ... | |
| #A+3c | A44 | |

| | | |
|---|---|---|
| r5→#p+00 | x1 | →fr0 |
| #p+04 | y1 | |
| #p+08 | z1 | |
| #p+0c | w1 | |
| #p+10 | x2 | |
| #p+14 | y2 | |
| #p+18 | z2 | |
| #p+1c | w2 | |
| ... | ... | |

| | | |
|---|---|---|
| r6→#p'+00 | x1' | ←fr0 |
| #p'+04 | y1' | ←fr9 |
| #p'+08 | z1' | ←fr10 |
| #p'+0c | w1' | ←fr11 |
| #p'+10 | x2' | |
| #p'+14 | y2' | |
| #p'+18 | z2' | |
| #p'+1c | w2' | |
| ... | ... | |

S10' — COMMAND STRING (OUTSIDE THE LOOP)

| 1 | mov #A, r4 |
|---|---|
| 2 | mov #p, r5 |
| 3 | mov #p'+4, r6 |
| 4 | sts #flwa, flwar0 |
| 5 | fmov.s @r4+, fr4 |
| 6 | fmov.s @r4+, fr5 |
| 7 | fmov.s @r4+, fr6 |
| 8 | fmov.s @r4+, fr7 |
| 9 | sts #flwa+1, flwar0 |
| ... | ⋮ |
| 13 | fmov.s @r4+, fr7 |
| 14 | sts #flwa+2, flwar0 |
| ... | ⋮ |
| 18 | fmov.s @r4+, fr7 |
| 19 | sts #flwa+3, flwar0 |
| ... | ⋮ |
| 23 | fmov.s @r4+, fr7 |

23 COMMANDS

FIG. 12B

S21' — COMMAND STRING (INSIDE THE LOOP)

| 1 | sts #flwah, flwar1 |
|---|---|
| 2 | fldi0 fr8 |
| 3 | fldi0 fr9 |
| 4 | fldi0 fr10 |
| 5 | fldi0 fr11 |
| 6 | sts #fswa, fswar0 |
| 7 | fmov.s @r5+, fr0 |
| 8 | fmac fr4, fr8 |
| 9 | fmac fr5, fr9 |
| 10 | fmac fr6, fr10 |
| 11 | fmac fr7, fr11 |
| 12 | sts #fswa+1, fswar0 |
| ... | ⋮ |
| 17 | fmac fr7, fr11 |
| 18 | sts #fswa+2, fswar0 |
| ... | ⋮ |
| 23 | fmac fr7, fr11 |
| 24 | sts #fswa+3, fswar0 |
| ... | ⋮ |
| 29 | fmac fr7, fr11 |
| 30 | sts #fswah, fswar1 |
| 31 | fmov.s fr8, @-r6 |
| 32 | fmov.s fr9, @-r6 |
| 33 | fmov.s fr10, @-r6 |
| 34 | fmov.s fr11, @-r6 |

34×n COMMANDS
(242 COMMANDS FOR n = 6)

1ST PROCESS

01 : MEMORY → a
02 : MEMORY → b
03 : c + 1 → c
04 : sts

2ND PROCESS

( 05 : a × b → b )    05 : MEMORY' → a (= a')
( 06 : b + c → b )    06 : MEMORY' → b (= b')
( 07 : b → MEMORY    07 : c + 1 → c )

08 : sts      3RD PROCESS

( 09 : a' × b' → b' )    09 : MEMORY" → a'(= a")
( 10 : b' + c → b' )    10 : MEMORY" → b'(= b")
( 11 : b' → MEMORY'   11 : c + 1 → c )

12 : sts
                            13 : a" × b" → b"
                            14 : b" + c → b"
                            15 : b" → MEMORY"

CONCURRENT PROCESS OF TWO COMMANDS

EXECUTION SEQUENCE →

DATA PROCESSING APPARATUS AND REGISTER ADDRESS TRANSLATION METHOD THEREOF

BACKGROUND OF THE INVENTION

The present invention relates to a data processing apparatus suitable for the handling of a large amount of data, and in particular, to a data processing method in which specification (mapping) of registers can be changed without altering instructions.

Data processors operating with digitized multimedia data including video and voice data to display images thereof for the user have been rapidly broadly employed in various application fields of personal information facilities such as information appliances born on cars, terminal equipment for family amusement, and internet terminals.

To process a large amount of data in a data processor, it is necessary to establish a correspondence between many physical registers to logical registers which can be specified by instructions. For this purpose, the SPARC architecture of the Sun Microsystems Inc. has been broadly employed in many systems. Details of the system has been described in "Microprocessor", Nikkei Datapro, p. 1; MC1-303-801 to 808, 1960/6). According to the article, the system includes 32 registers which can be accessed for reference by instructions, i.e., eight fixed registers and 24 non-fixed registers arranged in a sequence. Each time a subroutine jump takes place, the 24 registers slide 16 registers in a first direction among a number of registers provided for non-fixed registers. For each subroutine return, the registers slide also 16 registers in a second direction reverse to the first direction.

In the conventional technology, the change in the mapping of logical registers to the physical registers can be accomplished only at timing of the subroutine jump or return. Furthermore, the sliding range in the registers cannot be arbitrarily determined. Namely, the sliding can be achieved only within a zone of successive physical registers. Therefore, a data processor can be applied, even when the number physical registers thereof is larger than the number of physical registers which can be specified by instructions, only to such processes as the subroutine jump and return. However, a data processor handling multimedia data and the like is required to carry out, in addition to the processes above, a concurrent process of a large amount of data according to parameters specified. For this purpose, it is essential that a large number of parameters are stored in the registers.

SUMMARY OF THE INVENTION

It is therefore an object of the present invention to provide a data processing apparatus and a register address translation or conversion method for the same in which a set of registers to be specified by instructions are selected from a large number of registers to thereby achieve a register address translation with an increased number of degrees of freedom.

To achieve the object above according to the present invention, there is provided a register address translation method for a data processing apparatus in which instructions are processed using data stored in the registers specified by the instructions. Specifically, in response to a particular instruction, a control section specifies in a register address translation section a correspondence relationship between logical registers and physical registers in which the number of physical registers is greater than that of logical registers. With this provision, the access range of physical registers can be expanded using a register specification field of the instruction specifying a logical register.

Moreover, according to another point of view, the object above can be achieved as follows. When a logical register number specified by an instruction is translated into a physical register number by the register address translation section to thereby specify a register physically existing in the system, the control section receives a particular register number control instruction supervising the correspondence relationships between logical registers and physical registers and then conducts a switching operation between the groups of physical registers according to a control signal decided by the register number control instruction.

Additionally, the control signal may be determined according to an instruction type of the instruction, e.g., Load or Store instruction.

Furthermore, according to an aspect of the present invention, the number of registers which can be accessed via logical register numbers specified in instructions is smaller than that of registers physically existing in the system. In this situation, the bit value represented by a second number of bits and designated by a particular setting instruction is added to an upper position of all or some of the bits of the logical register number expressed by a first number of bits. As a result, the logical register number denoted by the first number of bits in an instruction is translated into the physical register number larger than the value expressed by the first number of bits.

In addition, the data processing apparatus to which the data address translation method is applicable according to the present invention includes a physical register and arithmetic means for processing an instruction using data stored in the physical register. The number of physical registers is greater than that of registers which can be accessed by logical register numbers. The apparatus further includes register number translation means for translating a logical register number specified by an instruction into a physical register number of the physical register according to a correspondence relationship established between the physical and logical registers. In the configuration, the register number translation means changes the correspondence relationship according to the instruction.

The register number translation means includes bank registers each for specifying a group of physical registers to produce a physical register number according to information created by combining the information of the bank register with the logical register number.

In the configuration, there are provided a plurality of registers as bank registers. The translation means obtains information by selecting one of the bank registers according to information of a portion of the logical register number and then combines the information with partial information of the logical register number to produce final information so as to generate a physical register number from the final information.

As above, the constitution according to the present invention includes a translation function to convert a logical register address into a physical register address and a function to specify a predetermined correspondence relationship for the translation function according to an instruction making reference to a register.

Moreover, the register address is translated through first to third steps while dynamically conducting a change-over operation between the correspondence relationships. In the first step, a logical register number specified by the instruction is transformed into a physical register number according to the correspondence relationship to resultantly specify a register physically present in the system. In the second step, the correspondence relationship is varied in response to the change operation of the instruction. In the third step, the logical register number specified by the instruction is converted into a physical register number according to the transformed correspondence relationship so as to specify the register physically existing in the system.

According to the constitution, since the correspondence relationship between the logical and physical registers is specified by an instruction, a physically large register file can be accessed using a smaller register specification field in the instruction, which advantageously increases the operation speed in the application of graphics and the like.

In accordance with the register address translation method of the present invention, since the correspondence relationship between the logical and physical registers can be dynamically altered by a predetermined change instruction, it is possible to access a physically large register file. The specification of the destination of storage can be changed according to, for example, the type of instruction. This resultantly increases the data processing speed.

Additionally, since a large physical register address can be obtained through the translation without increasing the register specification fields in the instruction, the expansion of functions can be easily achieved by increasing the number of physical register address registers. This facilitates improvement of performance of the processing apparatus of a personal information facility and the like.

BRIEF DESCRIPTION OF THE DRAWINGS

The objects and features of the present invention will become more apparent from the consideration of the following detailed description taken in conjunction with the accompanying drawings in which:

FIG. 5 is a schematic diagram showing another example of the register address translation section;

FIG. 7 is a schematic diagram showing another example of the register address translation section;

FIGS. 10A and 10B are coding lists of commands for the vertex calculation in the processing method of FIG. 9;

FIGS. 12A and 12B are coding lists of commands for the vertex calculation in the processing method of FIG. 11;

DESCRIPTION OF THE PREFERRED EMBODIMENTS

Description will be given in detail of an embodiment of the present invention by referring to the accompanying drawings.

Figure 2:
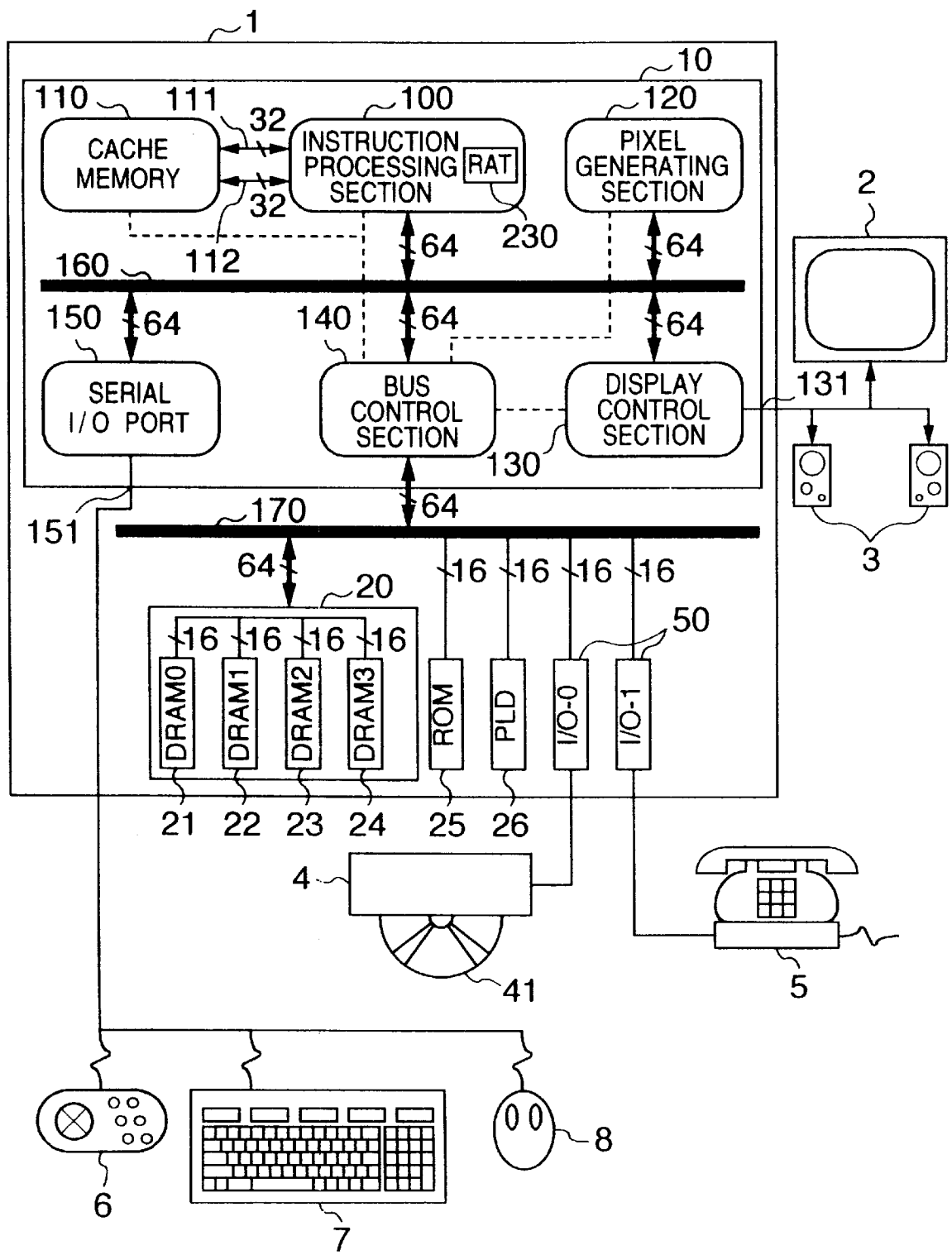
FIG. 2 is a diagram showing the construction of a multimedia data processing system to which the present invention is applied.

FIG. 2 shows the structure of a multi-media data processing system as an embodiment according to the present invention. The system includes a data processing apparatus 1 connected to a data output section including an image display 2 and a sound generating device 3, a media drive 4 for accessing to external storage media 41 such as a compact-disk read-only memory (CD-ROM) and digital video or versatile disk (DVD), a modem 5 for establishing connections to communication lines, a user indication input section including a key pad 6, a keyboard 7, and a mouse 8.

The data processor 1 includes a central processing unit (CPU) 10, a main storage 20 including dynamic random access memories 21 to 24 each handling 15-bit data, an auxiliary storage section including an ROM 25 and a PLD 26, and an input/output section 50 for establishing connections to the drive 4 and the modem 5.

The CPU 10 includes an instruction processing section 100, a cache memory 110, and a pixel generating section 120. Moreover, the CPU 10 includes an output port 131 for the data output section, a bus port 170 for communicating data with the input/output section 50, and an input port 151 for receiving inputs from the user indication input section. The output port 131 is connected to a display control section 130, the bus port 170 is linked with a bus control section, and the input port 151 is coupled with a serial I/O section 150.

The instruction processing section 100 includes a register address translation section or translator (RAT) 230 to translate a logical register address denoted by an instruction into a physical register address so as to specify a register physically existing in the system, which will be described later.

Between this instruction processing section 100 and the cache memory 110, there are provided two 32-bit bus systems 111 and 112 for instructions and data, respectively. Additionally, the processing section 100 includes a 64-bit bus port 160 connected to the display controller 130, bus controller 140, and serial I/O section 150. The bus 160 is arbitrated by the bus controller 140. For this purpose, the controller 140 is connected to the instruction processing section 100, cache memory 110, pixel generator 120, and display controller 130 via control signal lines indicated by dotted lines.

Figure 1:
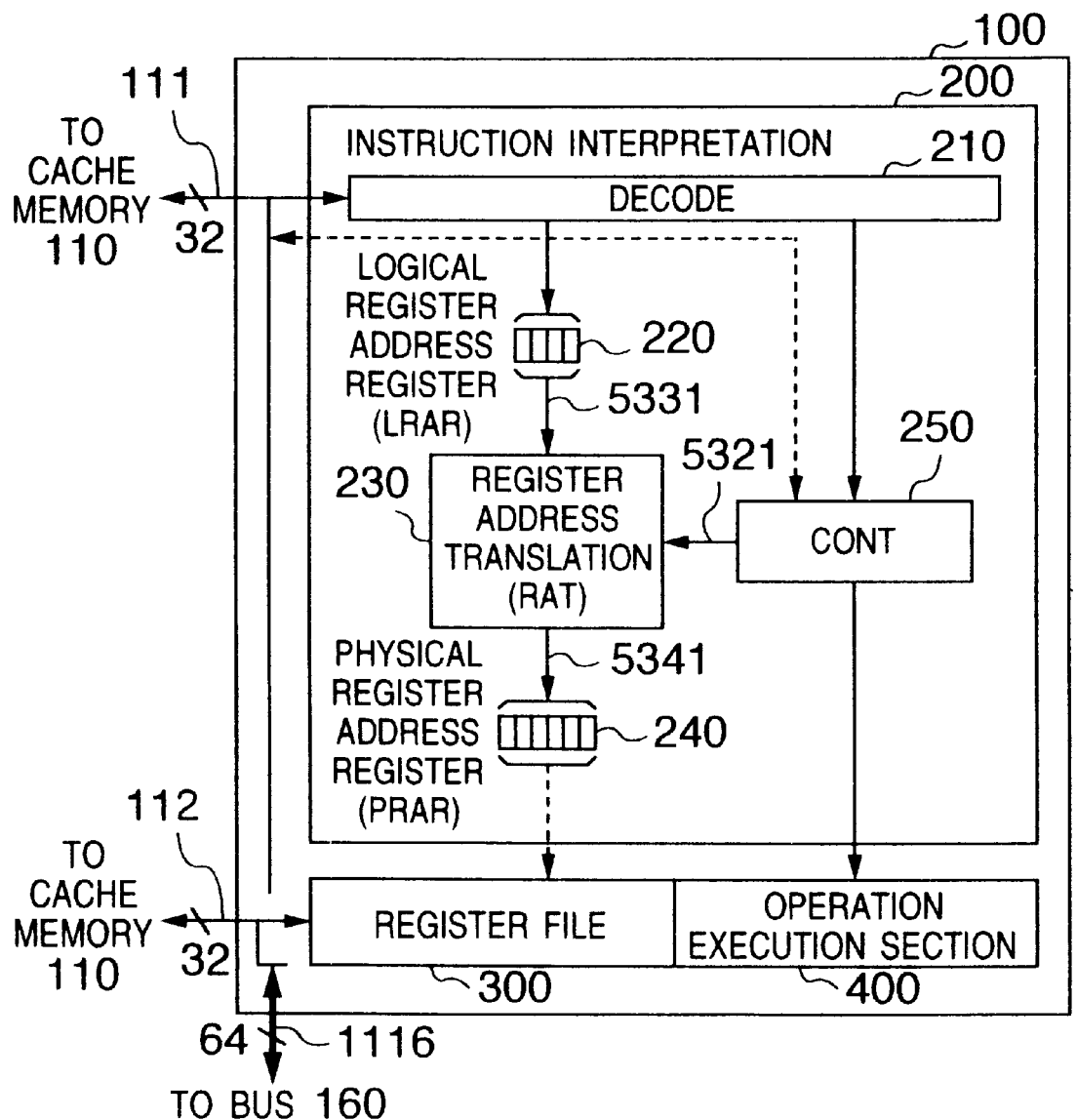
FIG. 1 is a schematic diagram showing the configuration of an instruction processing section as an essential unit of a data processing apparatus according to the present invention.

FIG. 1 shows an embodiment of the instruction processing section 100 as the essential component of the present invention. The instruction processing section 100 includes an instruction interpretation section 200, a register file 300, and an operation execution section 400. The instruction processor 100 receives an instruction via a 32-bit data line 111 from the cache memory 110 and stores the instruction in an instruction decoder 210. The processor 100 further achieves data communication between the cache memory 110 and the register file 300 via 32-bit data line 112. At occurrence of a block transfer of the instruction or data of the cache memory 110, the data lines are efficiently utilized, i.e., these two systems of data lines are assumed to be one 64-bit data line 1116 to be connected to the bus in the CPU 10.

Interpreting the received instruction, the instruction decoder 210 transfers register information representing a register to be specified to the logical register address register (LRAR) 220 and control information to an execution controller 250. According to the received control information (such as output information to the register address translator (RAT) 230 and control information for the execution of operation), the controller 250 supervises the RAT 230 and the operation execution section 400.

The RAT 230 receives a 4-bit logical register address and then transforms the address into a 6-bit physical register address according to a predetermined translation rule such that 16 registers specifiable by LRAR 220 are expanded to 64 registers specifiable by a physical register address register (PRAR) 240.

Figure 3:
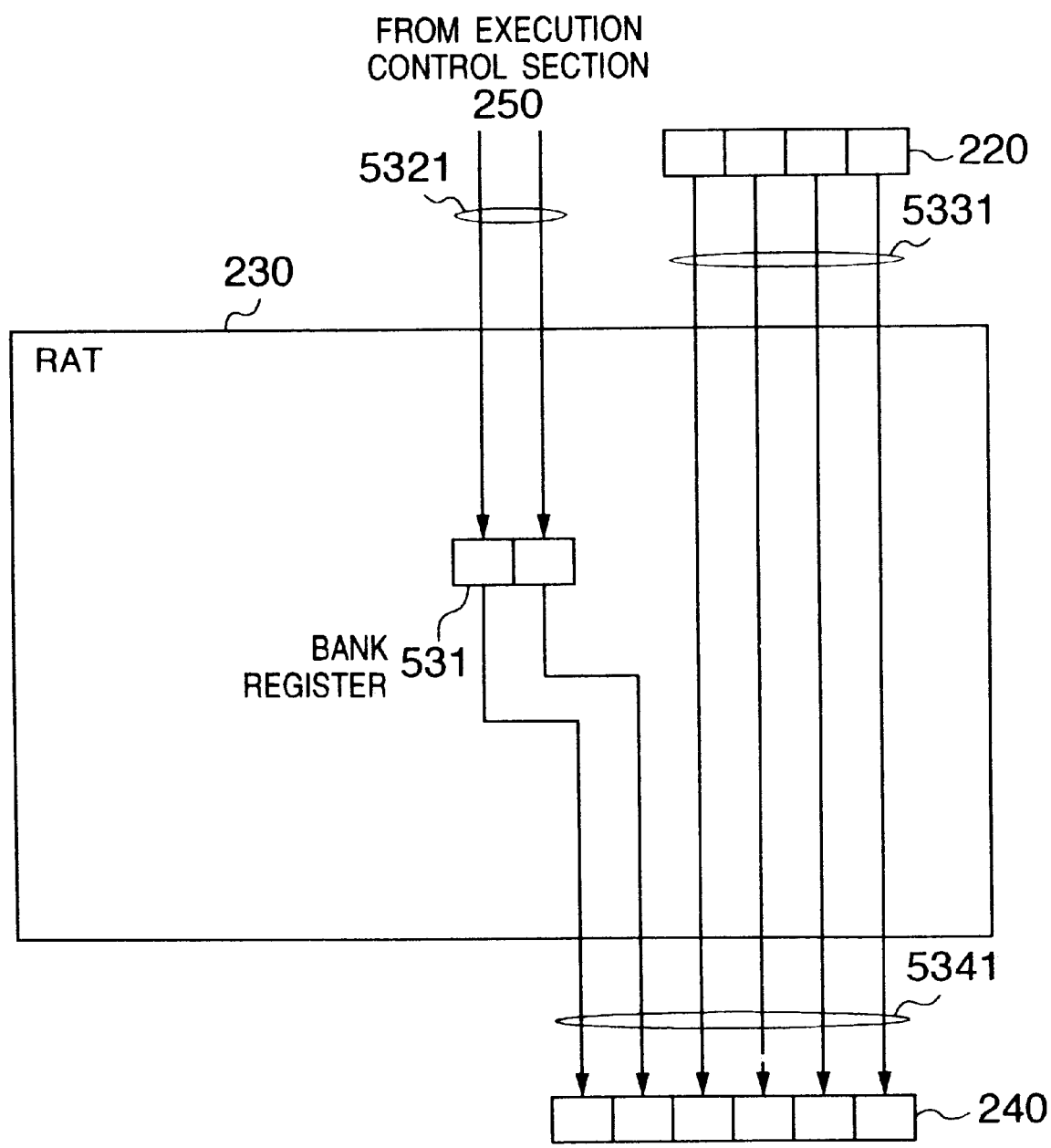
FIG. 3 is a schematic diagram showing an example of a register address translation section.

FIG. 3 shows an example of the register address translator 230. According to bank information 5321 outputted from the execution controller 250, the translator RAT 230 sets a two-bit internal state of a bank register 531 and then additionally assigns the two bits of the bank register 531 at two-bit position immediately preceding the 4-bit signal 5331 of LRAR 220 so as to send a 6-bit physical register address to PRAR 240.

The internal state of bank register 531 is set to a particular initial value when the system is powered. Usually, a numerically same correspondence relationship is established between LRAR 220 and PRAR 240. For example, the bank register 531 is initially set to "00" such that the initial state is altered only when the 32-bit bank information 5321 other than "00" is set to the bank register 531. Consequently, in a case in which only the existing software is to be executed, any modification is unnecessary for the software, namely, the software can be normally executed.

The bank information 5321 is stored in the bank register 531 when a particular instruction in an instruction format "STS #imm, bank" is executed by the CPU 100. In the format, STS, #imm, and bank respectively stand for an instruction mnemonic, a setting value to be stored in the bank register 531, and an address specifying the bank register 531. Specifically, #imm takes a two-bit value ranging from "00" to "11". The value is decided according to control information received by the execution controller 250 from the instruction decoder 210. Since the bank register 531 is a single register in this example, the specification of bank is unnecessary and is fixed to "0" or is independent of the value of bank specification. Incidentally, the value of bank register 531 may be read therefrom by the CPU 100 if necessary. This is also the case with another example of RAT 230, which will be described later.

Additionally, as indicated by dotted lines in FIG. 1, a portion of of address signal produced from the CPU is supplied to the execution controller 250 so that two most-significant bits of the address signal from the CPU 100 are stored in the bank register 531 of FIG. 3. In this situation, when the main storage 20 is subdivided into four memory banks, there can be achieved a register switch to a register group according to the pertinent memory bank.

Figure 4:
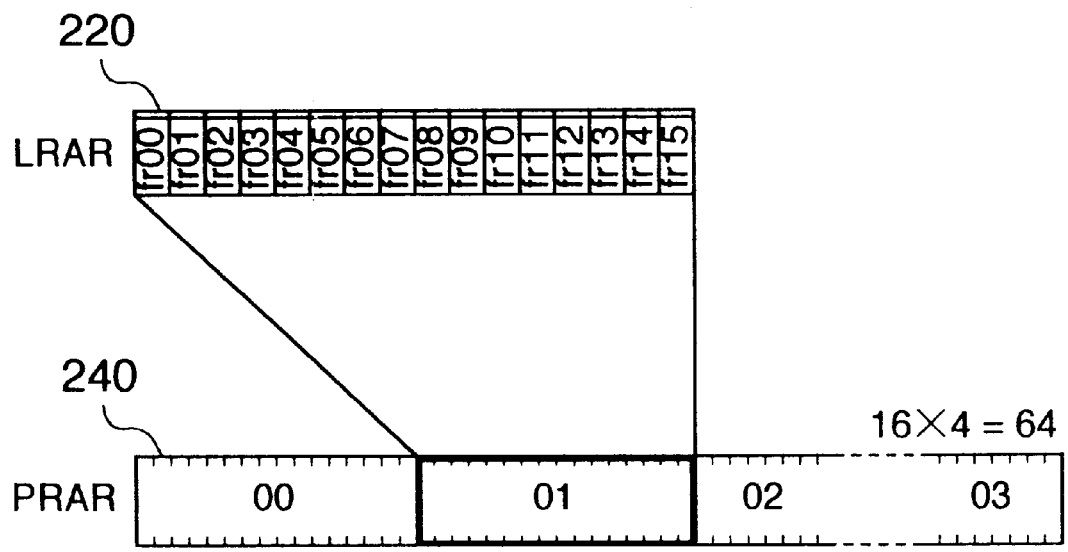
FIG. 4 is a diagram for explaining the correspondence relationship between logical and physical registers in the example of FIG. 3.

FIG. 4 is a diagram for explaining the correspondence relationship between logical register addresses and physical register addresses (or the register file) in which the internal state of bank register 531 is set to "01". PRAR 240 is divided into four banks each including 16 registers, and 16 registers of LRAR 220 respectively correspond to 16 registers of bank "01" of PRAR 240.

FIG. 5 shows another embodiment of the register address translator (RAT) 230. In this embodiment, two internal states are set by the 3-bit bank registers L 531 and H 532. Three low-order bits of LRAR 220 are outputted without any modification. One of the internal states of the bank registers of RAT 230 is selected by a selector 537 according to one high-order bit of LRAR 220 such that three resultant bits are delivered as three high-order bits of the physical register address to PRAR 240. In other words, three bits of the internal state from the bank register L 531 or H 532 are combined with three low-order bits of LRAR 220 into six bits, which are sent to PRAR 240.

Assume that 16 registers of LRAR 220 are classified into two logical register banks including eight high-order registers and eight low-order registers. The internal states respectively of the bank registers L 531 and H 532 operate as signals to specify physical registers in the logical register banks. The initial values to set the internal states of the bank registers L 531 and H 532 and the STS instruction format to store bank information in the bank registers L 531 and H 532 by the execution controller 250 are the same as those of FIG. 3. However, the values of "bank" in the STS instruction, namely, the addresses of the bank registers L 531 and H 532 are specified as "0" and "1", respectively.

Figure 6:
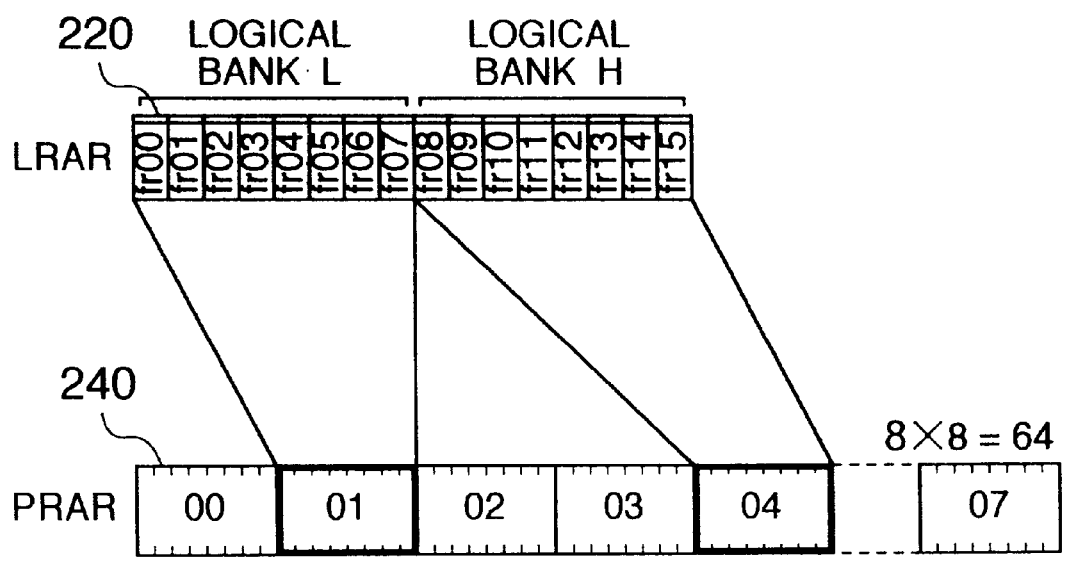
FIG. 6 is a diagram for explaining the correspondence relationship between logical and physical registers in the example of FIG. 5.

FIG. 6 shows the correspondence relationship between the logical register addresses and the physical register addresses (or the register file) in the embodiment of FIG. 5. According to FIG. 6, the internal states respectively of banks L 531 and H 532 are set to "001" and "100", respectively. LRAR 220 is classified into two logical register banks, i.e., a logical bank L including eight registers and a logical bank H inducing eight registers. Moreover, PRAR 240 is divided into eight physical register banks each including eight registers. When the register bank L 531 is in the internal state "001", eight registers of the logical bank L corresponds to the physical register bank "01" of PRAR 240. Additionally, when the internal state of the register bank L 532 is "100", eight registers of the logical bank H correspond to the physical register bank "04" of PRAR 240.

With this provision, eight high-order registers and eight low-order registers specified by the 4-bit LRAR 220 can be respectively associated with mutually different ones selected from the eight physical register banks in PRAR 240. Resultantly, for the registers used by system 1 itself and those adopted by the user, the correspondence relationship between the logical and physical registers can be separately supervised. Namely, this system provides a more satisfactory control operations when compared with the embodiment shown in FIG. 3.

FIG. 7 shows an alternative embodiment of the register address translator (RAT) 230. In this embodiment, the translator 230 is set to one of the four internal states using the 3-bit load bank register L 533, operation bank register L 534, load bank register H 535, and operation bank register H 536 according to the load/operation flag 5320. In operation, three low-order bits of LRAR 220 are directly outputted to PRAR 2413. According to a selector 537 operative with the first high-order bit and selectors 538 and 539 responsive to the instruction type flag 5320, there is selected one of the four internal states such that the selected bits are supplied as three high-order bits to PRAR 240.

Each internal state indicated by the load bank register L 533, operation bank register L 534, load bank register H 535, and operation bank register H 536 is related to a function as follows. Assume that 16 logical registers specified by LRAR 220 are classified into two logical register banks each including eight logical registers for each of the Load instruction and the like. The internal state of the registers above specifies a physical register bank related to the pertinent logical register bank. That is, three bits indicating the internal state and three low-order bits of LRAR 220 are combined with each other to be supplied to PRAR 240. The instruction format for the CPU 100 to set the internal state from the execution controller 250 is the same as that described in conjunction with FIG. 3. However, "bank" denotes the address of either one of the bank registers 533 to 536 and "#imm" stands for the setting value of internal state of the bank register specified by "bank".

The state of the instruction type flag 5320 is set according to the instruction type included in bank information 5321 from the execution controller 250. Namely, the internal state of instruction type flag 5320 designates the type of the instruction being executed by the CPU 10 so as to enable the switching of the selected physical register bank according to the instruction type. For example, assume that the instructions are classified into the Load instructions and the other instructions. Even when the same logical register number is specified in the register specification field of instructions, it is possible to allocate different physical registers respectively to the Load instructions and the other instructions. As a result, even in a predetermined instruction set, the data prefetch can be easily conducted using the existing register allocation scheduling without increasing the maximum number register specifications.

The instruction type flag 5320 is not limited to one bit. Namely, two or more bits may be used according to instruction types. When the scheduling is conducted according to the software pipeline, the number of bits of the flag 5320 may be set to allow concurrent operations for all operation types. In practice, the instruction types are classified, for example, into the Load instruction and the other instructions using one bit or the Load instruction, Store instruction, and the other instructions using two bits.

Figures 8A, 8B:
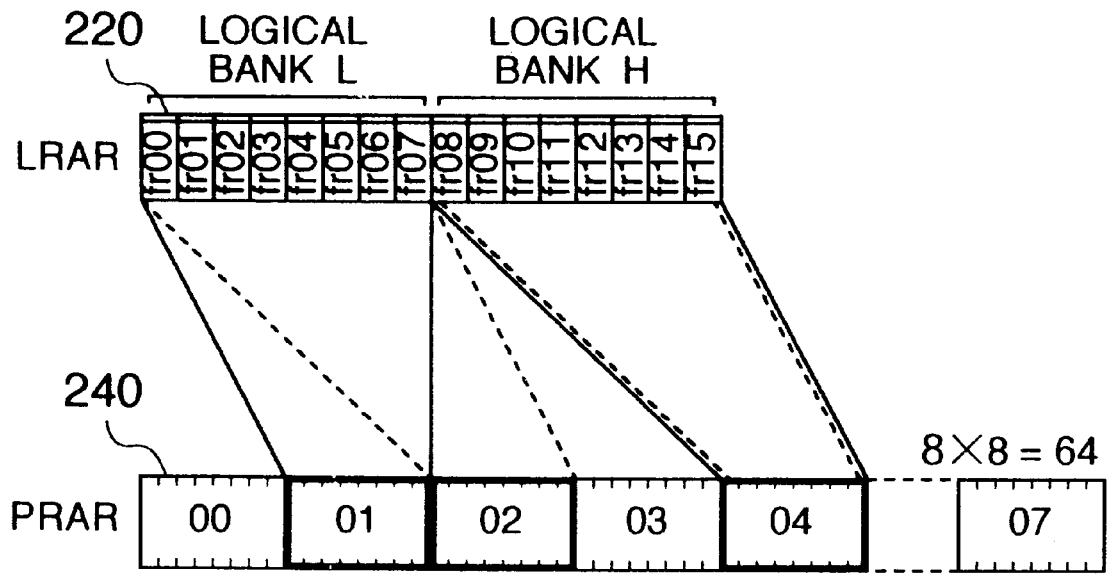
FIGS. 8A and 8B are diagrams for explaining the correspondence relationship between logical and physical registers in the example of FIG. 7.

FIG. 8A shows the correspondence relationship between the logical register addresses and the physical register addresses (register file) of the embodiment of FIG. 7. FIG. 8B shows a correspondence table 800 between the logical register banks and the physical register banks in relation to the instruction type flag. In these diagrams, the internal states of the load bank register L 533, operation bank register L 534, load bank register H 535, and operation bank register H 536 are set to "010", "001", "100", and "100", respectively.

LRAR 220 is divided into two banks, i.e., logical bank L and logical bank H each associated with eight logical registers. Additionally, PRAR 240 is classified into eight physical register banks each related to eight physical registers. In the execution of Load instruction, logical bank L and logical bank H of LRAR 220 respectively correspond to physical register banks "02" and "04" of PRAR 240. When executing instructions other than the Load instruction, logical bank L and logical bank H of LRAR 220 respectively correspond to physical register banks "01", and "04" of PRAR 240. In FIG. 8A, while the dotted lines indicate specifications of physical register banks for the Load instruction, the solid lines designate those of physical registers for the instructions other than the Load instruction. As can be seen from FIGS. 8A and 8B, when the logical bank H is selected, all instructions specify registers belonging to the same physical register bank. Namely, it is possible that the specification of physical registers is independent of the instruction type.

Also in FIGS. 5 and 7, it is desirable that the internal state of each register bank of RAT 230 is set to a particular value when the CPU 10 is powered and the registers are operated in the same way as for the conventional 16 registers unless the STS instruction is employed.

Figure 9:
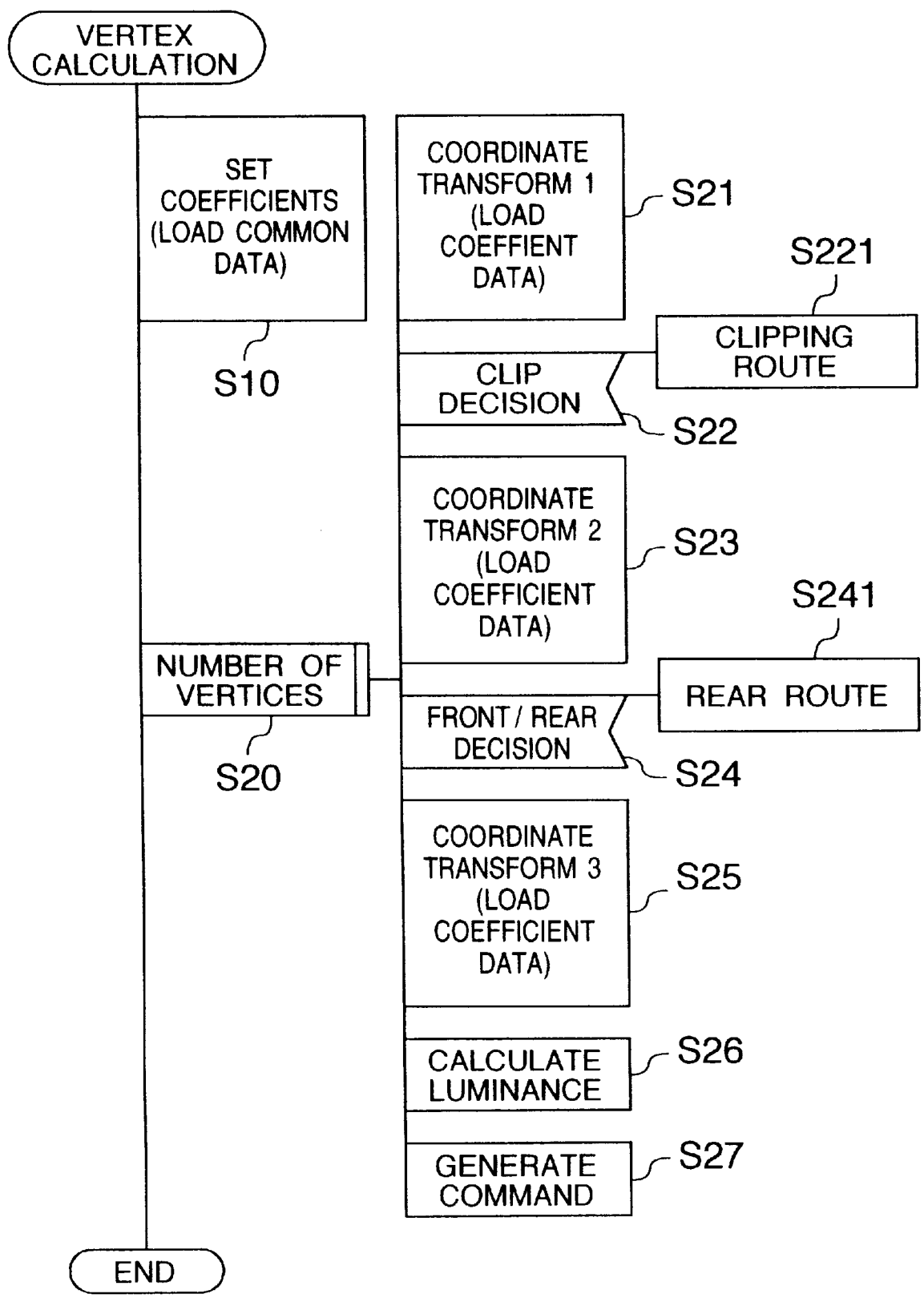
FIG. 9 is a processing flowchart of a general vertex calculation of the prior art.

Subsequently, description will be given of an example of a process to calculate vertices of a graphic image according to the data processing method of the present invention. FIG. 9 shows a general processing flow to calculate vertices of the prior art. After setting coefficients commonly used in the sequence of vertex calculation (S10), the subsequent process is repeatedly achieved as many times as there are vertices (S20). In other words, there are executed three coordinate transforming steps (S21, S23, S25), a luminance calculation step (S26), a command generation step (S27), a clip decision step (S22), and a front/rear decision step (S24). Each step includes about 100 instructions.

In the coordinate transform, a 4-row by 4-column matrix is multiplied by 4-element vector to produce a 4-element vector. In the operation, the 4-row by 4-column matrix is shared among the respective vertices and is assigned with common data by the coefficient setting step. However, there are required three matrices according to three types of coordinate transforms. Data of the matrices is loaded from the memory 20 when necessary.

In the clip decision, whether or not the resultant 4-component vector satisfies a predetermined condition is determined. If the condition is not satisfied, there is executed a special process called clipping route (S221). In the front/rear decision, it is determined whether or not the plane defined with a plurality of vertices satisfies a preset condition. If the condition is not satisfied, control is passed to a particular process called rear route (S241). These special processes are rarely executed and hence description will be given of the cases related to normal processes. In the command generating step, information of the plane of triangle generated through each vertex calculation is set to a command to the pixel generating section 120.

When the sequence of vertex calculation steps is executed, about 100 operations are required for each vertex. Since a large number of operations are to be executed, it is difficult to keep parameters only by 16 registers which can be specified by LRAR 220. For example, 16 registers are occupied only by the coordinate transforming matrix. In this situation, it is difficult to achieve the coordinate transforms 2 (S23) and 3 (S25) while keeping the matrix of coordinate transform 1 (S21). Consequently, since the elements of matrix necessary for the calculation are required to be read from the memory for each transform, the number of operations is increased and the processing performance is decreased.

FIG. 10A shows an example of coding of the coordinate transform (S21) under the vertex calculation condition of FIG. 9 in which the calculations of n vertices are accomplished by 47×n instructions. According to the analysis of actual systems, for the calculation with six vertices, there is required the largest number of operations, which is equivalent to 282 instructions. The contents of lines 17 to 25, 26 to 34, and 35 to 43 are the same as those of lines 8 to 16.

Operations of instructions used in the coding of FIG. 10A are defined as follows. In the example of 10A, flwar1 and sfwar1 are not employed.

(1) Description of Constants
A: First address of 4×4 matrix (16 floating point data items)
p: First address of 4 elements before transform (4 floating point data items)
p: First address of 4 elements after transform (4 floating point data items)
flwa: Register bank address; value to be set to flwar0.
fswa: Register bank address; value to be set to fswar0.
(2) Description of Registers
flwar1 (floating load word address register 1): Corresponding to 3-bit bank register 535 of FIG. 7 (register H 532 of FIG. 5).
fswar1 (floating store word address register 1): Corresponding to 3-bit bank register 536 of FIG. 7 (register H 532 of FIG. 5).
flwar0 (floating load word address register 0): Corresponding to 3-bit bank register 533 of FIG. 7 (register L 531 of FIG. 5).
fswar0 (floating store word address register 0): Corresponding to 3-bit bank register 534 of FIG. 7 (register L 531 of FIG. 5).
fr0 to fr15: Floating point data registers to store therein data as object of operation.
r0 to r15: Integer data registers to primarily store therein data addresses.
(3) Description of Instruction Operation (STS Instruction has Already Been Described and Description Thereof Will be Avoided)
mov #A,r4 (load instruction): Read data at memory address #A and store the data in integer register r4.
fldi0 fr8 (floating load immediate 0 instruction): Store 0 in fr8.
fmov.s @r5,fr0 (floating load word instruction): Read data at memory address indicated by the contents of r5 and store the data in fr0.
fmov.s @r4+,fr4 (floating load word instruction): Read data at memory address indicated by the contents of r4 and store the data in fr4. The contents of r is incremented to indicate a memory address of next data.
fmac fr4,fr8 (floating multiply and accumulate instruction): fr0×fr4+fr8 fr8.
fmov.s fr8,@-r6 (floating store word instruction): Decrement the contents of r6 to indicate a memory address of the previous data. Store the contents of fr8 at a memory address indicated by r6.

FIG. 10B shows the state of data stored in an address area of the main storage 20 when the instructions of FIG. 10A are executed.

In short, when lines 1 to 3 of FIG. 10A are executed, address values A (=A+00), p (=p+00), and p' (=p'+00) are loaded in registers r4, r5, and r6, respectively. Lines 4 to 7 initialize the contents of registers fr8 to fr11 to "0". Lines 8 to 11 load the contents of memory addresses A+00 to A+0F (A11, A21, A31, A41) in registers fr4 to fr7, respectively. Line 12 loads the contents (x1) of memory address p in register fr0. When the calculation of lines 13 to 16 are executed, the results of calculations are loaded in registers fr8 to fr11, respectively. Lines 17 to 43 accomplish the similar process such that the final results (x1',y1',z1',w1') loaded in registers fr8 to fr11 are respectively stored at memory addresses p'+00 to p'+0F.

Figure 11:
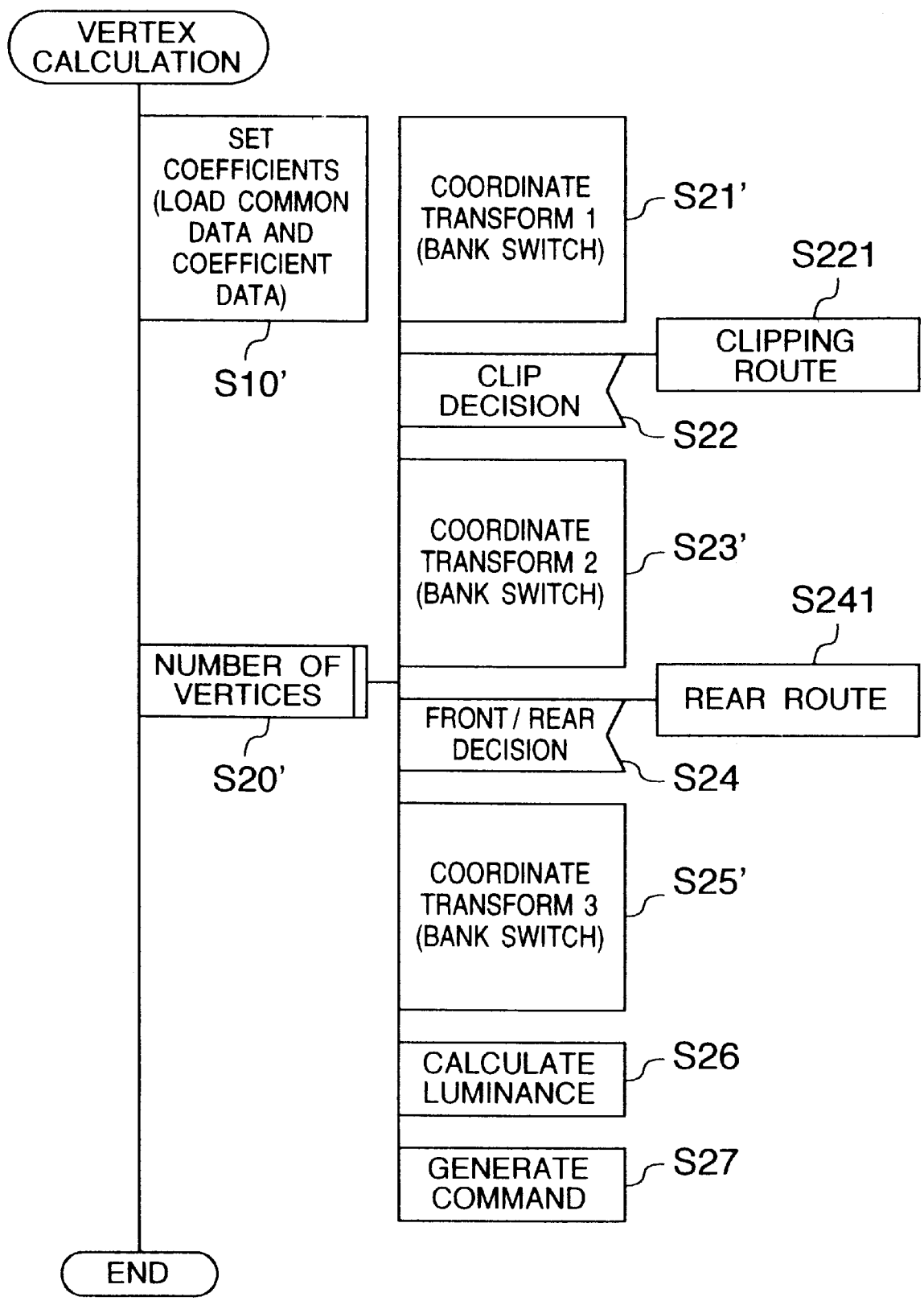
FIG. 11 is a processing flowchart of the vertex calculation to which the address translation processing method of FIG. 5 is applied.

FIG. 11 is a flowchart of the process of calculating vertices using the address transform according to the present invention. In this operation, 64 physical registers are provided for 16 logical registers.

In the coefficient setting step (S10'), there are set, in addition to the coefficient commonly used in the conventional vertex calculation, matrix data items for the respective coordinate transforming steps while changing the register bank. The following process is then executed as many times as there are vertices (S20). The coordinate transforming steps (S21', S23', S25') are the same as those of FIG. 9.

In the coordinate transform, the 4 by 4 matrix is multiplied by 4-element vector to generate a 4-element vector. In this case, not only the common data shred among the vertices, but also the matrix data items for the coordinate transforms 1 to 3 are beforehand set to the associated registers in lines 4 to 23 of FIG. 12A. Therefore, the operations of S21', S23' and S25' to load the matrix data items in the registers during the operation are unnecessary. Namely, it is only necessary to switch the register bank in S21', S23' and S25'.

FIGS. 12A and 12B show a coding example of the coordinate transform 1 under the vertex calculation condition of FIG. 11. The two-bank independent specification of FIG. 2 is adopted for the register address conversion. In the of coefficient setting process (S10'), the matrix data items for coordinate transforms 1 to 3 are kept in the expanded physical registers of PRAR 240 for the processes of a plurality of vertices such that the matrix data items are referred to while achieving a change-over between the physical register banks.

In the process outside the loop shown in FIG. 12A, namely, in the coefficient setting process (S10') of FIG. 11, the specification of physical register bank is conducted in the instruction format "sts #flwa, flwar0". In this format, flwar0 is the address of bank L 532 in RAT 230, the address indicating the destination of transform of 8 low-order logical registers (fr0 to fr7) selected from 16 logical registers. Moreover, #flwa stands for the address of a physical register bank in which the matrix data is stored. In FIG. 5, when either one of registers fr0 to fr7 is specified, bank register L 531 is selected since the upper-most bit of LRAR 220 is "0".

During the processes inside the loop shown in FIG. 12B, namely, during the coordinate transform processes (S21', S23', S25') of FIG. 11, the designation of physical register bank is carried out in the instruction format "sts #fswa, fswar0". In the format, fswar0 is the address of bank H 531 in RAT 230, the address denoting the destination of transform of 8 low-order logical registers (fr0 to fr7) selected from 16 logical registers. Additionally, #fswa stands for the address of a physical register bank in which the matrix data is stored. In the case of FIG. 5, #flwa and #fswa as well as flwar0 and fswar0 take respectively the same values in the embodiment.

In FIG. 12B, the specification of each coordinate transform step (S21', S23', S25') of FIG. 11 is executed in the form of "sts #flwah, flwar1". In the format, flwar1 is the address of bank H 532 of RAT 230 indicating the conversion destination of eight high-order logical registers (fr8 to fr15) and #flwah indicates the address of physical register bank as the storage destination of matrix data. In FIG. 5, when either one of the registers fr8 to fr15 is specified by an instruction, bank register H 532 is selected since the higher-most bit of LRAR 220 is "1".

Moreover, the operation is executed in the instruction format "sts #fswah, fswar1" in which fswar1 is the address of bank H 532 of RAT 230 indicating the destination of eight high-order logical registers and #fswa denotes the bank address as the storage of the matrix. In FIG. 5, #flwah and #fswah as well as flwar1 and fswar1 respectively take the same values.

Resultantly, 23 instructions are executed outside the loop, whereas 34×n instructions are executed inside the loop. For the calculation of six vertices requiring the largest number of operations, there are equivalently executed 227 instructions, which is namely about two third the instructions required in the conventional technology. According to the present invention, the processing performance is considerably improved in the application of graphics in which a large number of vertices are treated in the vertex calculation.

The data processing method using the address transform process of the present invention can be effectively applied not only to the concurrent process of operations including the vertex calculation, but also is efficiently applicable to a case in which the bank is altered according to the instruction type when the next data is pre-fetched during the operation. As above, since the expanded correspondence relationship of PRAR with respect to LRAR is dynamically switched without altering the instruction field length, the data processing speed can be easily increased.

In addition, when the address transforming process of the present invention is applied to the 8-bit and/or 16-bit information processors, the 32-bit and/or 64-bit physical register addresses can be obtained without changing the instruction field length. As a result, the function can be expanded by increasing the number of PRARs. With the provision, when the address transforming process is applied to such personal information apparatuses as amusement facilities, information equipment on vehicles, and internet terminals of which the amount of information to be processed is continuously increasing, it is possible to improve the performance thereof while keeping the cost.

Figure 13:
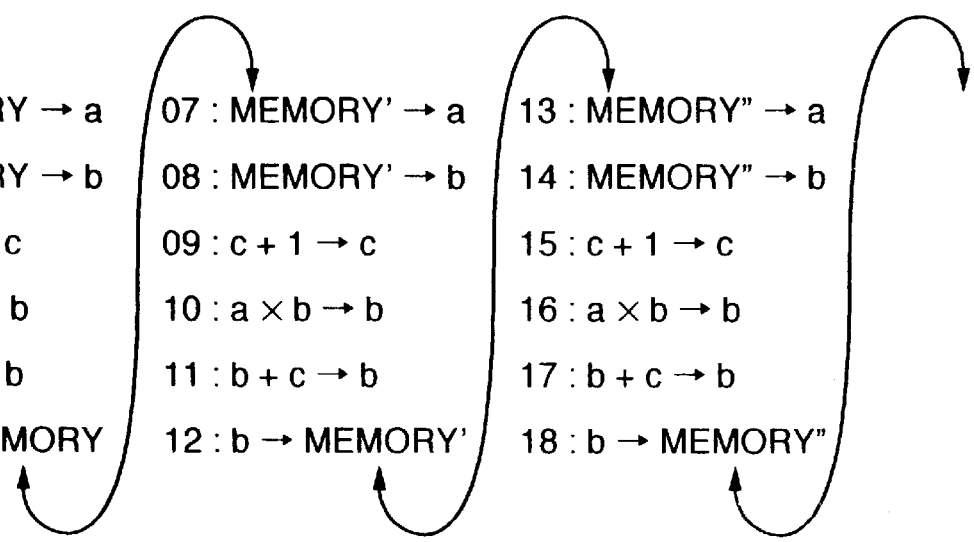
FIG. 13 is a diagram showing a general example in which a calculation including Load and Execute/Store commands without altering the group of registers.
Figures 14, 15:
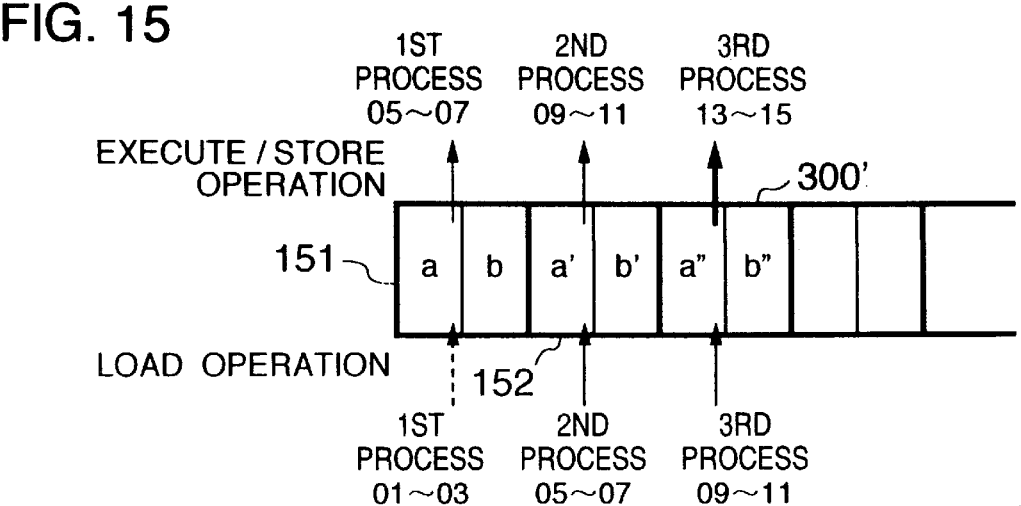
FIG. 14 is a diagram showing an example in which the calculation of FIG. 13 is conducted when the group of registers is varied according to the type of instruction.
FIG. 15 is a diagram showing a state of use of registers in the example of FIG. 14.

Referring next to FIGS. 13 to 15, description will be given of an example in which the bank register is changed according to the instruction type.

For simplification of description, the number of logical registers is minimized in the example. However, the effect of operation is not changed even when the number of logical registers is increased.

Assume a repetitious operation in which two data items are read from the memory, a multiplication is conducted therebetween, an iteration count is added to the result of multiplication, and the result of calculation is returned to the memory. It is assumed that the processor is in a super-scalar configuration to concurrently execute the Load/Store instruction and arithmetic instructions. Moreover, the load data cannot be used for the operation of the instruction immediately after the data loading instruction. For simplicity, two logical registers (a, b) and one fixed register are provided for operations of FIGS. 14 and 15. In the case of FIG. 13, each the registers a to c is a fixed register.

FIG. 13 shows an example of process in a general method of the prior art.

In FIG. 13, lines 01 and 02 load data in registers a and b. Line 03 increments the value of register C by one and line 04 multiplies the value of register a by the value of register b to load the result of multiplication in register b. Line 05 adds the result of multiplication of register b to the value of register C to load the result of addition in register b. Line 06 stores the value of register b at a predetermined address in the memory, thereby terminating the first process. The process above is repeatedly carried out.

In the repetition, the processes are executed in a fixed sequence. Namely, even when two instructions are concurrently executed in the process, there will not be obtained any remarkable advantage. Furthermore, the concurrent operation can be applied only to a combination of c+1→c and Load instruction. Although a portion of the second process is moved to the first process according the usual concurrent operation, this technology can be rarely possible because of an insufficient number of registers.

FIG. 14 shows an example of process conducted according to the present invention.

Lines 01 to 03 of FIG. 14 are the same as those of FIG. 13. Line 04 executes sts instruction. If Load instruction is to be executed as a result, physical registers a' and b' of the physical register bank 152 of FIG. 15 are set as logical registers a and b specified by the Load instruction. When the instruction to be executed is other than Load instruction, physical registers a and b of the physical register bank 151 of FIG. 15 are defined as logical registers a and b specified by the instruction.

According to the definition by the sts instruction in line 04, the arithmetic instruction of the first process and Load instruction of the second process can be concurrently executed in line 05 for the following reasons. Logical register a specified by the instruction of line 05 in the first process is changed to physical register a of physical register bank 151 of FIG. 15 and logical register a specified by Load instruction of line 05 in the second process is altered to physical register a' of physical register bank 152 of FIG. 15.

Similarly, lines 06, 09, and 10 can be concurrently processed. In lines 07 and 11, the concurrent operation is possible regardless of the definition by sts instruction.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A register address conversion method for use in a data processing apparatus including physical registers larger in number than logical registers specifiable by a register specification field of an instruction, said method comprising the steps of:

classifying the physical registers into a plurality of physical register banks;

receiving, by a register address converting section of the data processing apparatus, bank information for selection of a physical register bank to be specified and setting the bank information to a bank register in the address converting section;

receiving, by the register address converting section, logical register address information representing an address of a logical register specified by an instruction, adding the bank information set to the bank register to at least a portion of the logical register address information, and thereby producing a physical register address specifying one of physical registers in the physical register bank selected by the bank information; and allocating, by said register address converting section, a higher half and a lower half of the logical registers specifiable by one instruction respectively to first and second physical banks which are spaced apart by at least one physical bank.

2. A register address conversion method according to claim 1, wherein said bank information receiving step includes the steps of:

receiving bank information a plurality of times and respectively setting received bank information items to a plurality of bank registers, and receiving, by the register address converting section, selection information to select a bank register and selecting one of the bank registers in response to the received selection information; and said physical register address generating step includes the step of adding bank information set to the selected bank register to at least a portion of the logical register address information, thereby producing the physical register address.

3. A register address conversion method according to claim 2, wherein:

said selection information is a portion of the logical register address information; and the physical register address producing step includes the step of adding the bank information set to the selected bank register to at least a remaining portion of said logical register address information, thereby producing the physical register address.

4. A register address conversion method according to claim 3, wherein said selection information is an upper-most bit of the logical register address.

5. A register address conversion method according to claim 2, wherein:

said selection information has a value variable according to a type of the instruction; and said physical register address producing step includes the step of adding the bank information set to the selected bank register to at least a remaining portion of the logical register address information, thereby producing the physical register address.

6. A register address conversion method according to claim 5, wherein said selection information has a value varying between Load instruction and other instructions.

7. A register address conversion method according to claim 1, wherein said bank information is a portion of a memory address outputted from said data processing apparatus.

8. A data processing apparatus for executing instructions each including a logical register field specifying a logical register and thereby achieving a data process, comprising:

physical registers larger in number than that of logical registers to be specified by an instruction, said physical registers being classified into a plurality of physical register banks;

an instruction decoding section for interpreting an instruction and thereby outputting logical register address information and control information;

an execution control section for receiving said control information from the instruction decoding section and outputting bank information for selection of a physical register bank; and a register address converting section for receiving by a bank register said bank information from said execution control section, receiving said logical register address information from said instruction decoding section, and adding said bank information set to the bank register to at least a portion of said logical register address information, thereby producing a physical register address specifying one of physical registers in the physical register bank selected by said bank information, wherein said register address converting section allocates a higher half and a lower half of the logical registers specifiable by one instruction respectively to first and second physical banks which are spaced apart by at least one physical bank.

9. A data processing apparatus according to claim 8, wherein said register address converting section includes a plurality of bank registers for receiving the bank information a plurality of times and respectively setting the received information items to a plurality of bank registers, said register address converting section receives selection information to select a bank register and selects one of the bank registers in response to the received selection information, the register address converting section adds bank information set to the selected bank register to at least a portion of the logical register address information, thereby producing the physical register address.

10. A data processing apparatus according to claim 9, wherein the selection information is a portion of said logical register address information; and said register address converting section adds the bank information set to the selected bank register to at least a remaining portion of said logical register address information, thereby producing said physical register address.

11. A data processing apparatus according to claim 10, wherein said selection information is an upper-most bit of said logical register address.

12. A data processing apparatus according to claim 9, wherein the execution control section outputs to said register address converting section said selection information having a value variable according to a type of the instruction, and said register address converting section adds said bank information set to the selected bank register to at least a remaining portion of the logical register address information, thereby producing the physical register address.

13. A data processing apparatus according to claim 12, wherein the selection information has a value varying between Load instruction and other instructions.

14. A data processing apparatus for executing an instruction including a logical register field specifying a logical register and thereby achieving a data process, comprising:

physical registers larger in number than that of logical registers to be specified by an instruction, said physical registers being classified into a plurality of physical register banks;

an instruction decoding section for interpreting the instruction and thereby outputting logical register address information and control information;

an execution control section for receiving the control information from said instruction decoding section and a portion of a memory address signal outputted from said data processing apparatus and producing from the portion of the memory address, said bank information for the selection of a physical register bank; and a register address converting section for receiving by a bank register the bank information from said execution control section, receiving said logical register address information from said instruction decoding section, and adding bank information set to the bank register to at least a portion of the logical register address information, thereby producing a physical register address specifying one of physical registers in the physical register bank selected by said bank information, wherein said register address converting section allocates a higher half and a lower half of the logical registers specifiable by one instruction respectively to first and second physical banks which are spaced apart by at least one physical bank.

15. A register address conversion method for use with a data processing apparatus for processing an instruction using data stored in a register specified by the instruction, said method comprising the steps of:

specifying in association with the instruction a correspondence relationship between logical registers and physical registers, said physical registers larger in number than that of said logical registers; and enabling access to physical registers by a register specification field which can specify a range of the logical registers, wherein a higher half and a lower half of the logical registers specifiable by one instruction are allocated respectively to first and second physical banks which are spaced apart by at least one physical bank.

16. A register address conversion method for use with a data processing apparatus for processing an instruction using data stored in a register specified by the instruction, said method comprising the step of: dynamically changing, when replacing a logical register number specified by the instruction with a physical register number for specifying a register physically existing in the data processing apparatus, a correspondence relationship between logical registers and physical registers according to a control signal determined by a register number control instruction controlling the correspondence relationship wherein a higher half and a lower half of the logical registers specifiable by one instruction are allocated respectively to first and second physical banks which are spaced apart by at least one physical bank.

17. A register address conversion method according to claim 16, wherein the control signal is determined according to an instruction type of the instruction.

18. A register address conversion method according to claim 16, wherein the number of registers which can be referred to using the logical register number is less than the number of registers physically existing in the data processing apparatus.

19. A register address conversion method according to claim 18, further comprising the step of:

adding a bit value of the control instruction represented by a second number of bits to all of or a portion of the bits of the logical register number represented by a first number of bits, thereby converting the logical register number represented by the first number of bits in the instruction into a physical register number larger than the first bit number.

20. A data processing apparatus, comprising:

physical registers for storing therein data, said physical registers being larger in number than that of logical registers specifiable by logical register numbers;

arithmetic means for processing an instruction using data stored in said physical registers; and register number converting means for converting the logical register number specified by the instruction into a physical register number of the physical register according to a correspondence relationship between the logical and physical register numbers, wherein said register number converting means allocates a higher half and a lower half of the logical registers specifiable by one instruction respectively to first and second physical banks which are spaced apart by at least one physical bank.

21. A data processing apparatus according to claim 20, wherein said register number converting means includes bank registers for respectively specifying groups of the physical registers and generating the physical register number according to information attained by combining information of the bank register with the logical register number.

22. A data processing apparatus according to claim 21, further comprising a plurality of registers as the bank registers, wherein the physical register number is generated by information obtained by combining information attained by selecting one of the bank registers according to a portion of information of the logical register number with partial information of the logical register number.

23. A data processing apparatus according to claim 20, wherein the correspondence relationship is changed according to a type of an instruction referring to the register.

24. A data processing apparatus, comprising:

data output means for outputting multimedia data therefrom;

operation input means for inputting information of operation;

data processing means for processing multi-media data, said data processing means including physical registers for storing therein the multi-media data, and an arithmetic unit for processing instructions using the multi-media data stored in the registers, each of the instructions having a register specification field having a predetermined bit length indicating a range of the local registers; and register number converting means having a conversion pattern for conversion from a logical register number specified by the register specification field into a physical register number exceeding the range indicated by the predetermined bit length, thereby allocating a higher half and a lower half of the logical registers specifiable by one instruction respectively to first and second physical banks which are spaced apart by at least one physical bank.

* * * * *